(12) United States Patent
Jung et al.

(10) Patent No.: US 7,217,027 B2
(45) Date of Patent: May 15, 2007

(54) BACKLIGHT ASSEMBLY WITH IMPROVED STRENGTH AND DISPLAY DEVICE HAVING THE SAME

(75) Inventors: Dae-Yoon Jung, Yongin-si (KR); Jeoung-Gwen Lee, Suwon-si (KR); Mi-Sook Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/219,161

(22) Filed: Sep. 2, 2005

(65) Prior Publication Data

US 2006/0056202 A1  Mar. 16, 2006

(30) Foreign Application Priority Data

Sep. 3, 2004  (KR) .................. 10-2004-0070339

(51) Int. Cl.
*F21V 7/04* (2006.01)
*F21V 21/00* (2006.01)

(52) U.S. Cl. ................ 362/632; 362/633; 362/634; 362/249

(58) Field of Classification Search ........ 362/632–634, 362/606, 620, 249, 217, 29, 225, 362; 349/58–60
See application file for complete search history.

(56) References Cited

U.S. PATENT DOCUMENTS

| 4,189,125 | A | * | 2/1980 | Little | 248/346.02 |
|---|---|---|---|---|---|
| 4,782,428 | A | * | 11/1988 | Lowell et al. | 362/11 |
| 5,729,950 | A | * | 3/1998 | Hardy | 52/693 |
| 5,988,825 | A | * | 11/1999 | Masters et al. | 362/20 |
| 6,941,718 | B1 | * | 9/2005 | diGirolamo et al. | 52/695 |
| 6,979,102 | B2 | * | 12/2005 | You | 362/218 |

* cited by examiner

*Primary Examiner*—Renee Luebke
*Assistant Examiner*—Evan Dzierzynski
(74) *Attorney, Agent, or Firm*—F. Chau & Associates, LLC

(57) ABSTRACT

A backlight assembly having improved strength and a display device having the backlight assembly are provided. The backlight assembly includes a light source supplying light and a fixing member receiving the light source. A deflection preventing portion having a predetermined width is formed on a surface of the fixing member in a direction crossing a diagonal on the surface of the fixing member.

35 Claims, 7 Drawing Sheets

BACKLIGHT ASSEMBLY WITH IMPROVED STRENGTH AND DISPLAY DEVICE HAVING THE SAME

CROSS-REFERENCE TO RELATED APPLICATION

The present application claims priority to Korean Patent Application No. 2004-0070339 filed on Sep. 3, 2004, the contents of which are herein incorporated by reference in their entirety.

BACKGROUND OF THE INVENTION (a) Technical Field

The present disclosure relates to a backlight assembly having improved strength and a display device having the backlight assembly, and more particularly to a backlight assembly in which strength of a fixing member is improved by forming beads on a surface of the fixing member and a display device having the backlight assembly.

(b) Discussion of the Related Art

There has been increased demand for small and light display devices with better performance, due to, at least in part, further development of semiconductor technologies.

Among such display devices, a liquid crystal display (LCD) has small size, small weight, and low power consumption. As a result, liquid crystal display devices have been used as a substitute for the existing cathode ray tubes (CRTs). LCDs are used for almost all information processing apparatuses which require a display device.

In a liquid crystal display device, a specific molecular alignment of liquid crystal cells is changed into another molecular alignment by applying a voltage, and a change in optical characteristics of liquid crystal cells, such as birefringence, optical rotary power, dichroism, and optical scattering, is converted into a visual change. That is, information is displayed by using the optical modulation of the liquid crystal cells.

The display devices, such as liquid crystal display devices, are applied to digital televisions having a large size. The display devices applied to such large-sized products have very small thickness when compared with their areas. As a result, the large display devices are sensitive to external impacts.

Methods for improving a structure of a display device are needed to address the sensitivity to impact. For example, in the display device with increased size, strength reinforcement in the diagonal direction, as well as strength reinforcement in the horizontal and vertical directions is desired to prevent twisting of the display device.

SUMMARY OF THE INVENTION

Embodiments of the present invention provide a backlight assembly in which strength is improved to prevent twisting in the diagonal direction and a display device having the backlight assembly.

The backlight assembly according to an embodiment of the present invention includes a light source supplying light, and a fixing member receiving the light source. A deflection preventing portion having a predetermined width is formed on a surface of the fixing member in a direction crossing a diagonal on the surface of the fixing member.

The deflection preventing portion preferably has a first deflection preventing portion which is formed in a direction crossing a first diagonal on the bottom surface of the fixing member; and a second deflection preventing portion which is formed in a direction crossing a second diagonal on the bottom surface of the fixing member.

A plurality of first deflection preventing portions and a plurality of second deflection preventing portions are preferably formed to be alternately connected in the upper half area and the lower half area on the bottom surface of the fixing member.

Preferably, the deflection preventing portions formed in the upper half area on the bottom surface of the fixing member are symmetrical to the deflection preventing portions formed in the lower half area.

Connecting portions for connecting joints between the first deflection preventing portions and the second deflection preventing portions may be formed on the bottom surface of the fixing member to have a predetermined width.

The connecting portions are preferably formed by pressing the fixing member.

A plurality of connecting portions may be formed parallel to each other.

Preferably, the backlight assembly according to an embodiment of the present invention also includes a reflecting sheet which is located adjacent to the bottom surface of the fixing member and the connecting portions are protruded toward the reflecting sheet.

The plurality of first deflection preventing portions may be formed parallel to each other.

The plurality of second deflection preventing portions may be formed parallel to each other.

The first deflection preventing portions are preferably formed to extend to at least one corner of both corners in a direction of the second diagonal direction.

The second deflection preventing portions may cross the second diagonal, and may be connected to the first deflection preventing portions.

The second deflection preventing portions are preferably formed to extend to at least one corner of both corners in a direction of the first diagonal.

The first deflection preventing portions may cross the first diagonal, and may be connected to the second deflection preventing portions.

The number of first deflection preventing portions may be 4, 6, or 8.

The number of second deflection preventing portions may be 4, 6, or 8.

Preferably, an angle $\alpha$, which the deflection preventing portion forms with respect to the diagonal of the bottom surface of the fixing member, satisfies the expression arctan $(W/L)<\alpha<90°$, where W denotes the width of the bottom surface of the fixing member and L denotes the length of the bottom surface of the fixing member.

The deflection preventing portion may be protruded toward the reflecting sheet.

Preferably, the light source includes a plurality of lamps, and the plurality of lamps are received adjacent each other in a line by the fixing member.

The deflection preventing portion may be formed by pressing the fixing member.

A display device according to an embodiment of the present invention includes a panel unit displaying an image, a light source supplying light to the panel unit, and a fixing member receiving the light source. A deflection preventing portion is formed on a surface of the in a direction crossing a diagonal on the surface of the fixing member.

The deflection preventing portion may include a first deflection preventing portion which is formed in a direction crossing a first diagonal on the bottom surface of the fixing member, and a second deflection preventing portion which is formed in a direction crossing a second diagonal on the bottom surface of the fixing member.

Preferably, a plurality of first deflection preventing portions and a plurality of second deflection preventing portions are formed to be alternately connected in the upper half area and the lower half area on the bottom surface of the fixing member.

Preferably, connecting portions for connecting joints between the first deflection preventing portions and the second deflection preventing portions are formed on the bottom surface of the fixing member to have a predetermined width.

The display device according to an embodiment of the present invention may also include a reflecting sheet which is located adjacent to the bottom surface of the fixing member. The connecting portions may be protruded toward the reflecting sheet.

The first deflection preventing portions may be formed to extend to at least one corner of both corners in a direction of the second diagonal.

The second deflection preventing portions may cross the second diagonal, and may be connected to the first deflection preventing portions.

The second deflection preventing portions may be formed to extend to at least one corner of both corners in a direction of the first diagonal.

The first deflection preventing portions may cross the first diagonal, an may be connected to the second deflection preventing portions.

Preferably, an angle $\alpha$, which the deflection preventing portion forms with respect to the diagonal of the bottom surface of the fixing member satisfies the expression $\arctan(W/L)<\alpha<90°$, where, W denotes the width of the bottom surface of the fixing member and L denotes the length of the bottom surface of the fixing member.

The deflection preventing portion is preferably protruded toward the reflecting sheet.

The light source has a plurality of lamps, and the plurality of lamps are preferably received adjacent each other in a line by the fixing member.

The panel unit may be a liquid crystal display panel.

BRIEF DESCRIPTION OF THE DRAWINGS

Preferred embodiments of the present invention can be understood in more detail from the following descriptions taken in conjunction the attached drawings in which.

DETAILED DESCRIPTION OF THE EMBODIMENTS

Preferred embodiments of the present invention will now be described more fully hereinafter below in more detail with reference to the accompanying drawings, in which preferred embodiments of the invention are shown. This invention may, however, be embodied in different forms and should not be construed as limited to the embodiments set forth herein.

Figure 1:
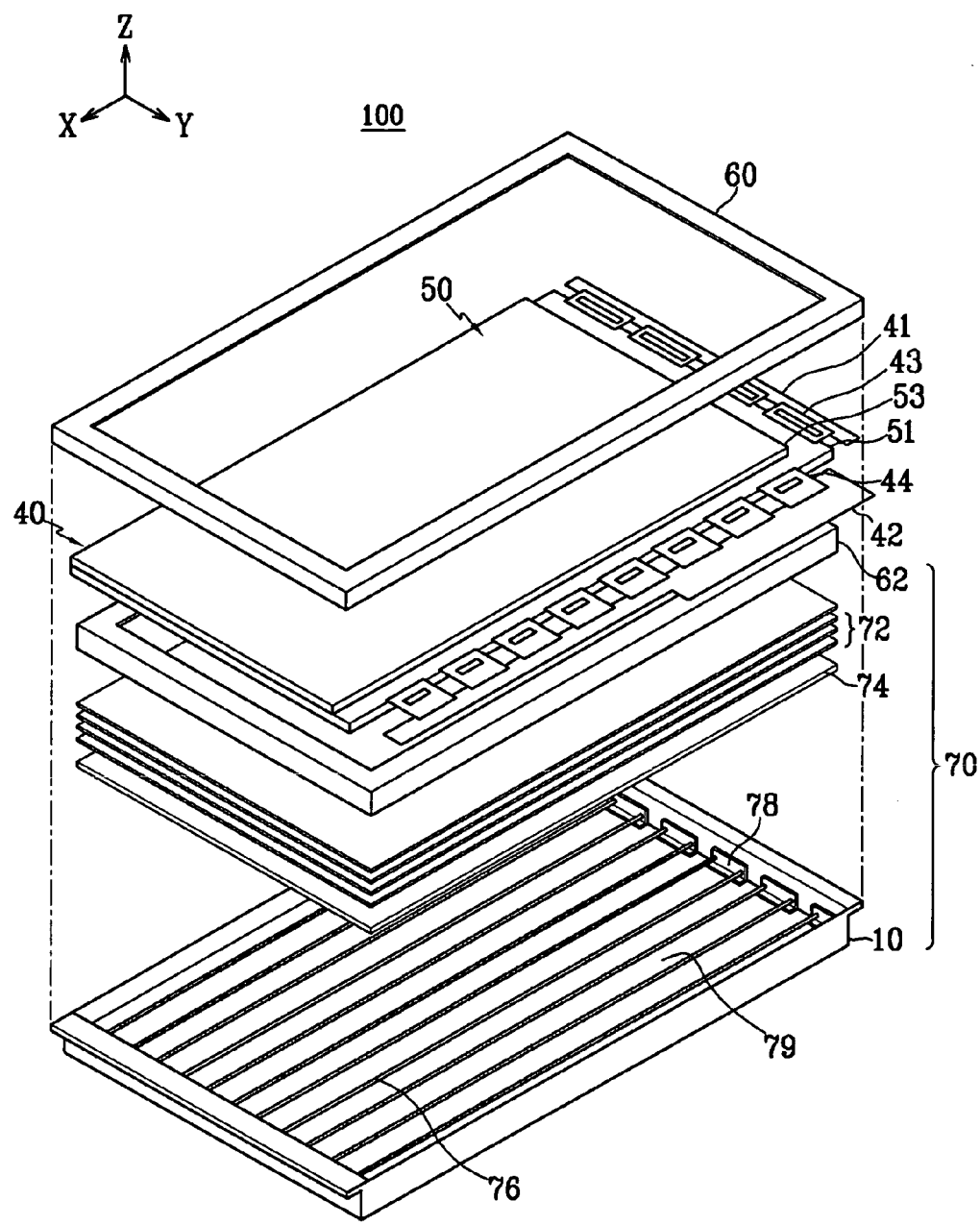
FIG. 1 is an exploded perspective view illustrating a display device having a backlight assembly according to an embodiment of the present invention.

FIG. 1 shows a direct type display device 100 which may be used for a large-sized television, for example.

The display device 100 includes a panel unit 50 on which an image is displayed and a backlight assembly 70 for supplying light to the panel unit 50. The panel unit 50 is fixed on the backlight assembly 70 by a top chassis 60. The top chassis 60 can be made of, for example, a resin or a metal.

It is to be understood that, although an LCD panel unit is shown as the panel unit 50, the present invention is not limited thereto.

A panel assembly 40 includes the panel unit 50, driver integrated circuit packages 43 and 44, and printed circuit boards ("PCBs") 41 and 42. A plurality of driver integrated circuit packages 43 and 44 are electrically connected to gate lines and data lines formed on the panel unit 50, respectively. The driver integrated circuit packages can be COF (Chip On Film) types, tape carrier packages, or the like.

The panel unit 50 comprises a TFT (Thin Film Transistor) panel 51 including a plurality of thin film transistors, a color filter panel 53 disposed over the TFT panel 51, and liquid crystal (not shown) interposed between the two panels 51, 53.

The TFT panel 51 is a transparent glass panel in which a plurality of thin film transistors are formed in a matrix shape. Source terminals formed on the TFT panel 51 are connected to the data lines, and gate terminals formed thereon are connected to the gate lines. In addition, pixel electrodes including transparent ITO (indium tin oxide), which is a conductive material, are formed in drain terminals.

The data lines and the gate lines of the panel unit 50 are connected to the driver integrated circuit packages 44 and 43, respectively. If electrical signals from the data PCB 42 are input to the source terminals and electrical signals from the gate PCB 41 are input to the gate terminals, the thin film transistors are turned on or off depending upon the electrical signals, and electrical signals necessary to form an image are output to the drain terminals. A control board (not shown) electrically connected to the data PCB 42 takes driving signals from the outside and applies the driving signals to the data lines and the gate lines of the panel unit 50.

Meanwhile, the color filter panel 53 is arranged on the TFT panel 51 so that TFT and color filter panels 51, 53 are opposed to each other. The color filter panel 53 is a panel on which RGB pixels for displaying various colors by transmitting light are formed. A common electrode including ITO is formed on the surface of the color filter panel 53. If a driving voltage is applied to the gate terminals and the source terminals of the thin film transistors in order to turn on the thin film transistors, an electric field is formed between the pixel electrodes and the common electrode of the color filter panel 53. An alignment angle of the liquid crystal molecules interposed between the TFT panel 51 and the color filter panel 53 is changed due to the electric field and light transmittance is changed in accordance with the changed alignment angle, thereby obtaining a desirable image.

The gate PCB 41 supplies gate driving signals to the panel unit 50 through the gate driver integrated circuit package 43. The data PCB 42 supplies data driving signals to the panel unit 50 through the data driver integrated circuit package 44.

A backlight assembly 70 is disposed below the panel unit assembly 40 to uniformly supply light to the panel unit 50 displaying an image. The backlight assembly 70 includes a light source 76 supplying light to the panel unit 50. A plurality of light sources 76 are received in a fixing member 10. Although a plurality of lamps are shown in FIG. 1, other light sources, such as a linear light source and a planar light source may be used instead of the lamps.

The backlight assembly 70 includes the light sources 76, a reflecting sheet 79, light source holders 78, a diffusing plate 74, and optical sheets 72. These elements are received by the fixing member 10 and are fixed by a mold frame 62. The fixing member 10 can be made of, for example, a metal or a resin.

The light sources 76 are disposed to be spaced by a predetermined gap from each other. The light source holders 78 are disposed at both ends of the light sources 76 to fix the light sources 76. The reflecting sheet 79 reflects the light emitted from the light sources 76. The diffusing plate 74 uniformly diffuses the light emitted from the light sources 76. The optical sheets 72 enhance the brightness of light and supply the light to the panel unit 50.

The bottom or rear surface of the fixing member 10 is provided with an inverter 46 (see FIG. 2A) and a control board (not shown). The inverter 46 is covered and protected with a shield case 64. Lamp wires 761, connected to the light sources 76, are electrically connected to the inverter 46 by using sockets 77.

The inverter 46 transforms an external voltage into a constant voltage level and supplies the constant voltage to the light sources 76 to drive the light sources 76. The control board is connected to the data PCB 42 and supplies the driving signals to the panel unit 50.

The bottom surface of the fixing member 10 of the display device 100 is deformed when pressure is applied to the bottom surface of the fixing member 10. Accordingly, it is possible to provide a display device in which twisting at the time of carrying and transferring is prevented.

Figure 2:
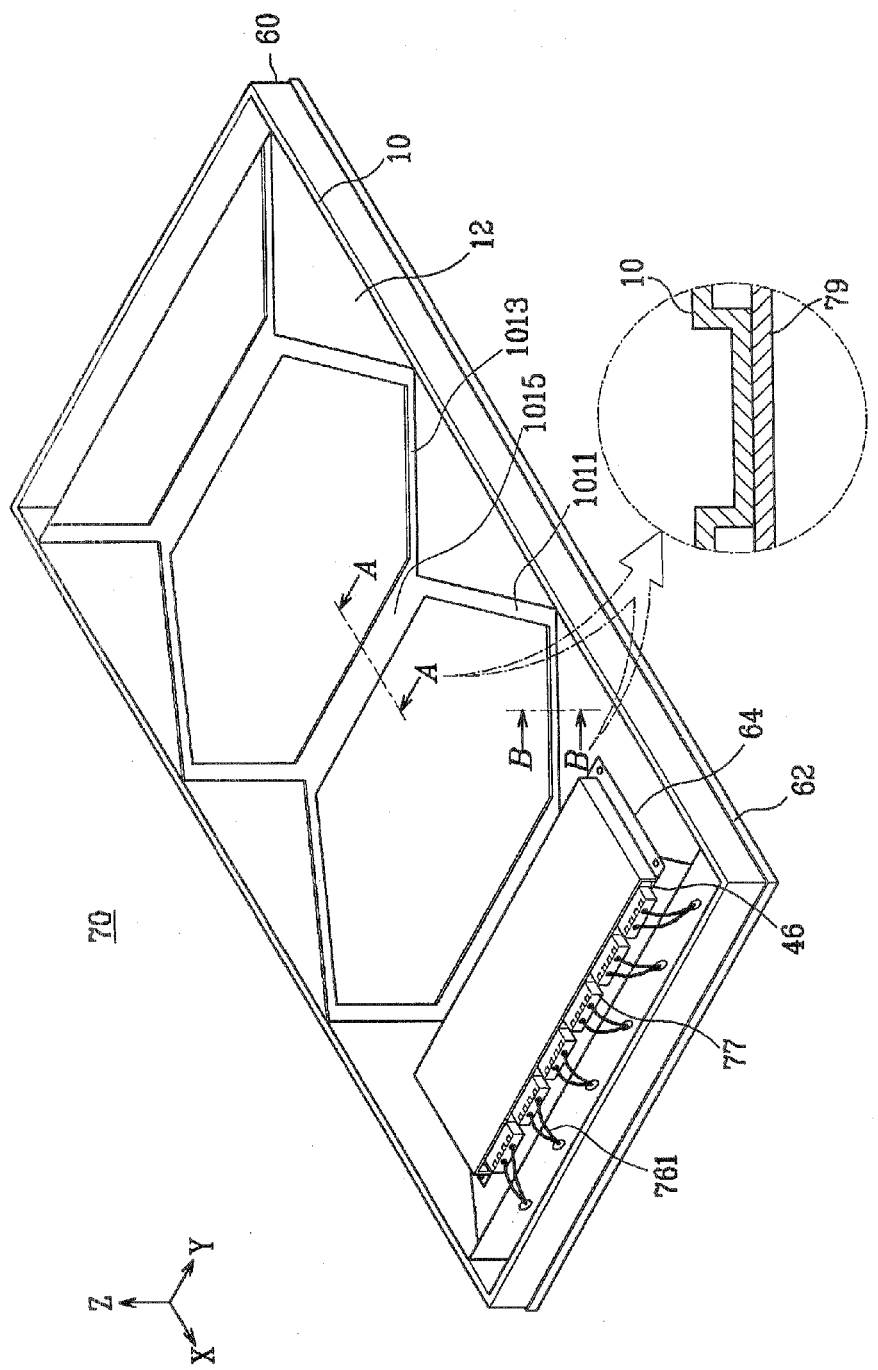
FIG. 2A is a rear perspective view illustrating a backlight assembly according to an embodiment of the present invention.
FIG. 2B is a cross-sectional view of the fixing member and the reflecting sheet taken along the line AA or BB in FIG. 2A, according to an embodiment of the present invention.

The structure of the bottom surface of the fixing member 10 is described with reference to FIGS. 2 to 4.

FIG. 2A shows the rear surface of the backlight assembly 70 shown in FIG. 1, wherein the fixing member 10 is shown as part of the backlight assembly 70 in the assembled state.

A plurality of deflection preventing portions 1011 and 1013 and a plurality of connecting portions 1015 having predetermined widths, such that the deflection preventing and connecting portions enhance the strength of the fixing member 10, are formed on the bottom surface 12 of the fixing member 10. As a result, the strength of the fixing member 10 can be enhanced to prevent twisting when, for example, carrying the device. The deflection preventing portions 1011 and 1013 are formed in directions crossing the diagonal directions of the bottom surface 12 in order to prevent twisting of the fixing member 10. The diagonal directions are directions which cross the X axis direction and the Y axis direction in FIG. 2A.

The connecting portions 1015 are formed on the bottom surface 12 of the fixing member 10 to mutually connect joints between the first deflection preventing portions 1011 and the second deflection preventing portions 1013. The connecting portions 1015 extend in the Y axis direction.

A cross-section of the fixing member 10 and the reflecting sheet 79 taken along Line AA or Line BB is shown in the enlarged circle of FIG. 2B. Line AA cuts the connecting portions 1015 and Line BB cuts the first deflection preventing portions 1013. As shown in the enlarged circle of FIG. 2B, the fixing member 10 is protruded toward the reflecting sheet 79. Since the fixing member 10 is formed to be protruded toward the reflecting sheet 79, the inverter 46 can be easily mounted on the bottom surface 12 of the fixing member 10. The reflecting sheet 79 is made of a relatively hard plate and can be disposed on the fixing member 10.

The deflection preventing portions 1011 and 1013 and the connecting portions 1015 have predetermined widths, such that the defection preventing and connecting portions enhance the strength of the fixing member 10 to prevent twisting. Therefore, the deflection preventing portions 1011 and 1013 and the connecting portions 1015 enhance the strength of the backlight assembly 70 applied to, for example, a large-sized apparatus, such as a television. That is, the increase in size of a display device causes concentration of stress in both diagonal directions to twist the display device. However, by forming the deflection preventing portions 1011 and 1013 and the connecting portions 1015 having a large enough width in the fixing member, twist can be prevented. The deflection preventing portions 1011 and 1013 and the connecting portions 1015 can be formed without forming protrusions.

The structure of the fixing member 10 is further described with reference to FIGS. 3 and 4.

Figure 3:
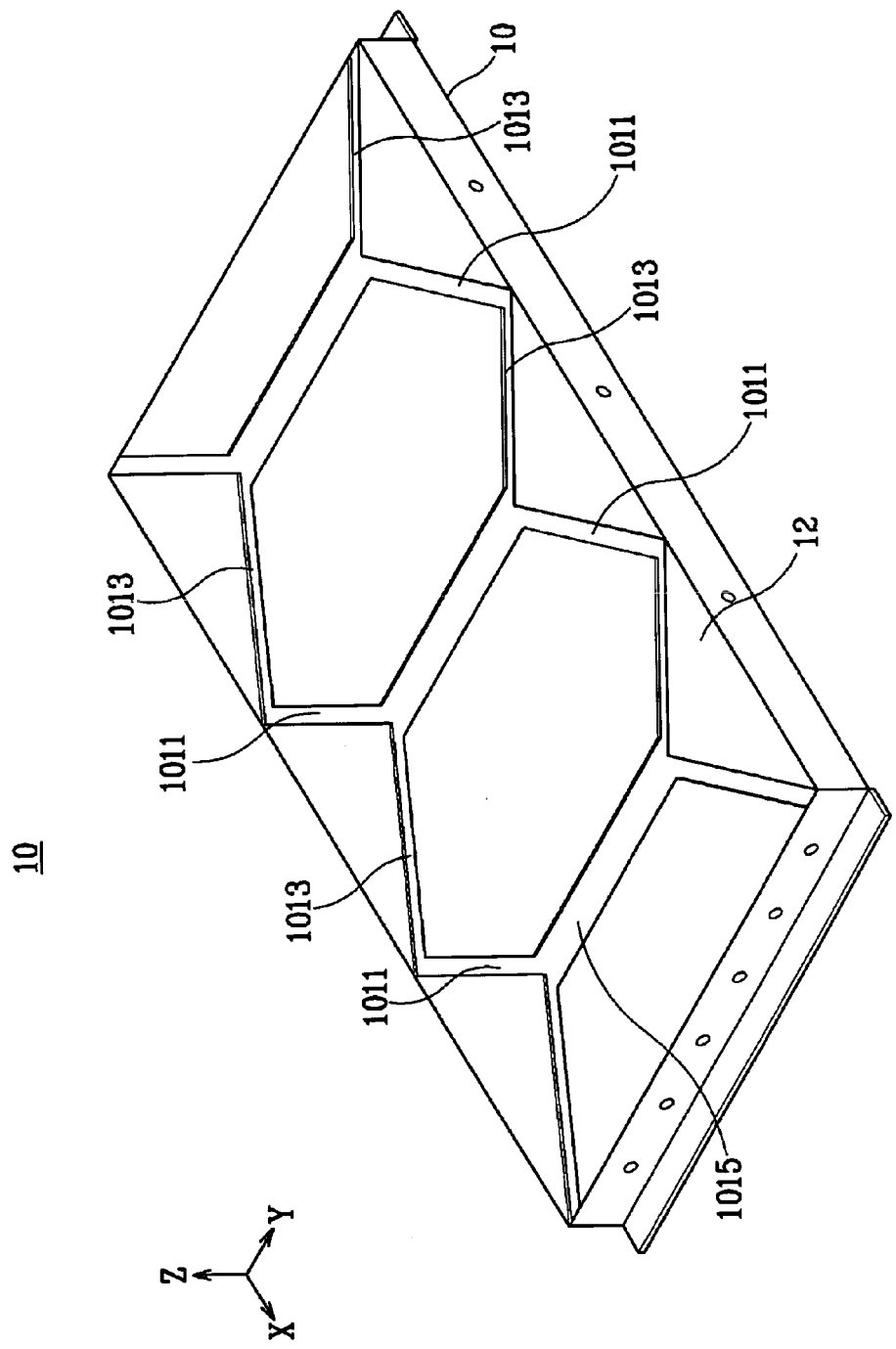
FIG. 3 is a rear perspective view illustrating a fixing member provided in a backlight assembly according to an embodiment of the present invention.

FIG. 3 shows a fixing member 10 which is separated from the backlight assembly 70 shown in FIG. 2A. A plurality of first deflection preventing portions 1011 are formed parallel to each other and a plurality of second deflection preventing portions 1013 are also formed parallel to each other. Accordingly, when an external force capable of causing twist of the bottom surface 12 of the fixing member 10 acts, the first deflection preventing portions 1011 and the second deflection preventing portions 1013 provide a constant resistance to the external force. Therefore, the strength of the fixing member 10 is enhanced to prevent twist of the fixing member 10.

The first deflection preventing portions 1011 and the second deflection preventing portions 1013 are formed in at upper and lower areas, along the y-axis, of the bottom surface 12 to be alternately connected. Since the first deflection preventing portions 1011 and the second deflection preventing portions 1013 are alternately connected, the strength of the fixing member 10 is enhanced.

The number of first deflection preventing portions 1011 formed on the bottom surface 12 of the fixing member 10 is 6. Three first deflection preventing portions 1011 are formed in the upper area of the bottom surface 12, with respect to the y-axis, and three first deflection preventing portions 1011 are formed in the lower area of the bottom surface 12, with respect to the y-axis. Similarly, 6 second deflection preventing portions 1013 are formed on the bottom surface 12 of the fixing member 10, 3 in the upper area and 3 in the lower area. A small number of deflection preventing portions 1011 and 1013 and connecting portions 1015 on the bottom surface 12, may provide the desired strength of the fixing member 10. The deflection preventing portions 1011 and 1013 and the connecting portions 1015 may be formed in, for example, a bead shape or a stiffener shape.

Figure 4:
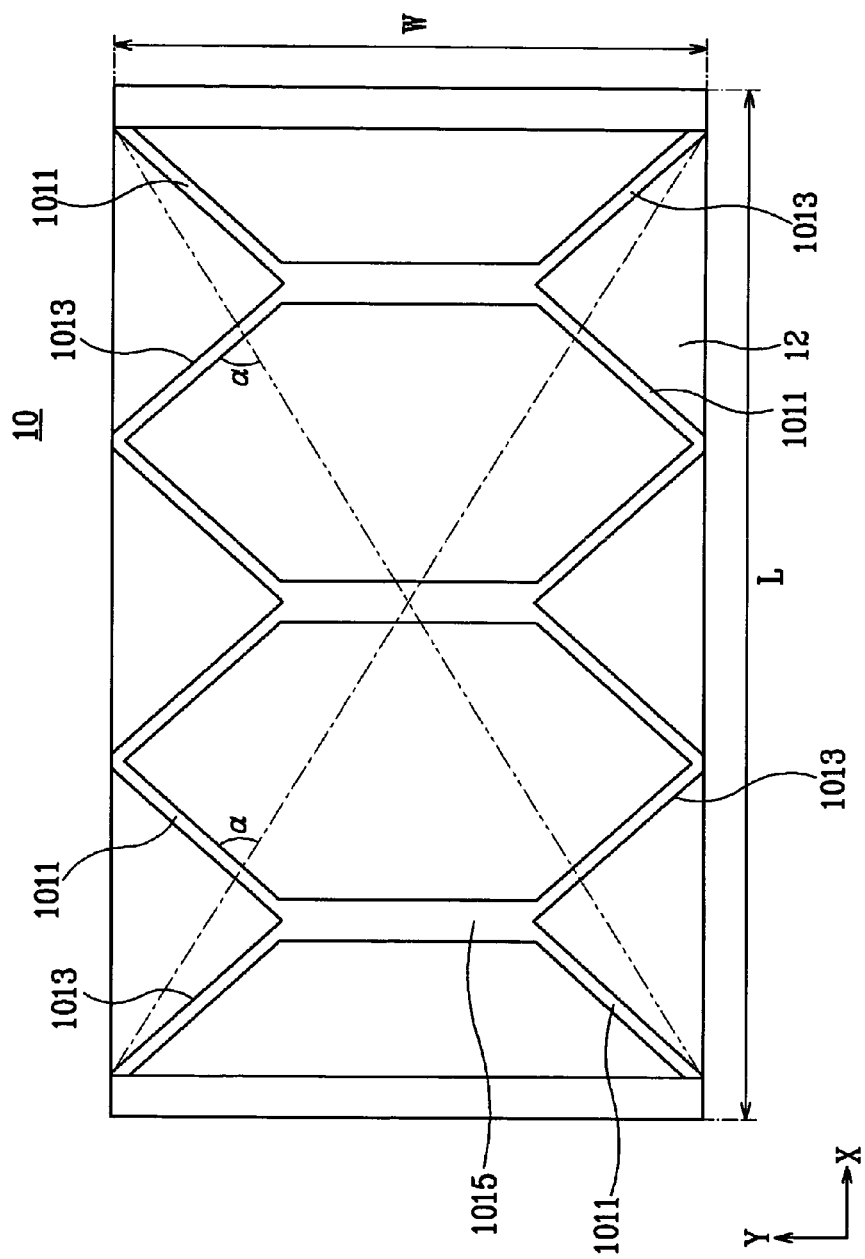
FIG. 4 is a plan view illustrating the fixing member shown in FIG. 3.

As shown in FIG. 4, the first deflection preventing portions 1011 are formed in the direction crossing a first diagonal direction (indicated by the single-dotted line) connecting the left upper corner and the right lower corner of the fixing member 10 (left and right and upper and lower being relative to the x-axis and y-axis, respectively, shown in FIG. 4). The second deflection preventing portions 1013 are formed in the direction crossing a second diagonal direction (indicated by the double-dotted line) connecting the right upper corner and the left lower corner of the fixing member 10. When the fixing member 10 has a large area, twist can be generated in the first diagonal direction and the second diagonal direction. Therefore, by forming the first deflection preventing portions 1011 and the second deflection preventing portions 1013 in directions crossing both diagonal directions, twist of the fixing member 10 is prevented.

The deflection preventing portions 1011 and 1013 formed in the upper area of the bottom surface 12 of the fixing member 10 are symmetrical with the deflection preventing portions 1011 and 1013 formed in the lower area of the bottom surface 12 of the fixing member 10. As a result, the deflection preventing portions 1011 and 1013 can be formed by machining the fixing member 10 by press machining or the like. Also, since the connecting portions 1015 are parallel to each other, the formation thereof is facilitated.

Among a plurality of first deflection preventing portions, the first deflection preventing portions 1011 formed at the right upper corner and the left lower corner extend to both corners in the second diagonal direction (indicated by the double-dotted line) of the bottom surface 12 of the fixing member 10. Alternatively, the first deflection preventing portions 1011 may extend to one corner in the second diagonal direction.

The second deflection preventing portions 1013 connected to the first deflection preventing portions 1011 cross the second diagonal direction, thereby preventing twist of the fixing member 10. Among a plurality of second deflection preventing portions, the second deflection preventing portions 1013 formed at the left upper corner and the right lower corner extend to both corners in the first diagonal direction (indicated by the single-dotted line) of the bottom surface 12 of the fixing member 10. Alternatively, the second deflection preventing portions 1013 may extend to one corner in the first diagonal direction. The first deflection preventing portions 1011 connected to the second deflection preventing portions 1013 cross the first diagonal direction, thereby improving the strength of the fixing member 10.

The deflection preventing portions 1011 and 1013 form an angle $\alpha$ about the first diagonal direction and the second diagonal direction of the bottom surface 12 of the fixing member 10. The angle $\alpha$ preferably satisfies the following Expression:

$$\arctan(W/L) < \alpha < 90°$$

where, W denotes the width (Y axis direction) of the bottom surface 12 of the fixing member 10 and L denotes the length (X axis direction) of the bottom surface 12 of the fixing member 10.

In the above Expression, $\arctan(W/L)$ should be greater than 0 in order to form the deflection preventing portions 1011 and 1013 in the diagonal directions and to prevent twist of the fixing member 10. Further, $\alpha$ should be an acute angle, that is, less than 90°. By forming the deflection preventing portions 1011 and 1013 having the above-mentioned angle range, it is possible to efficiently prevent twisting of the fixing member 10.

Figure 5:
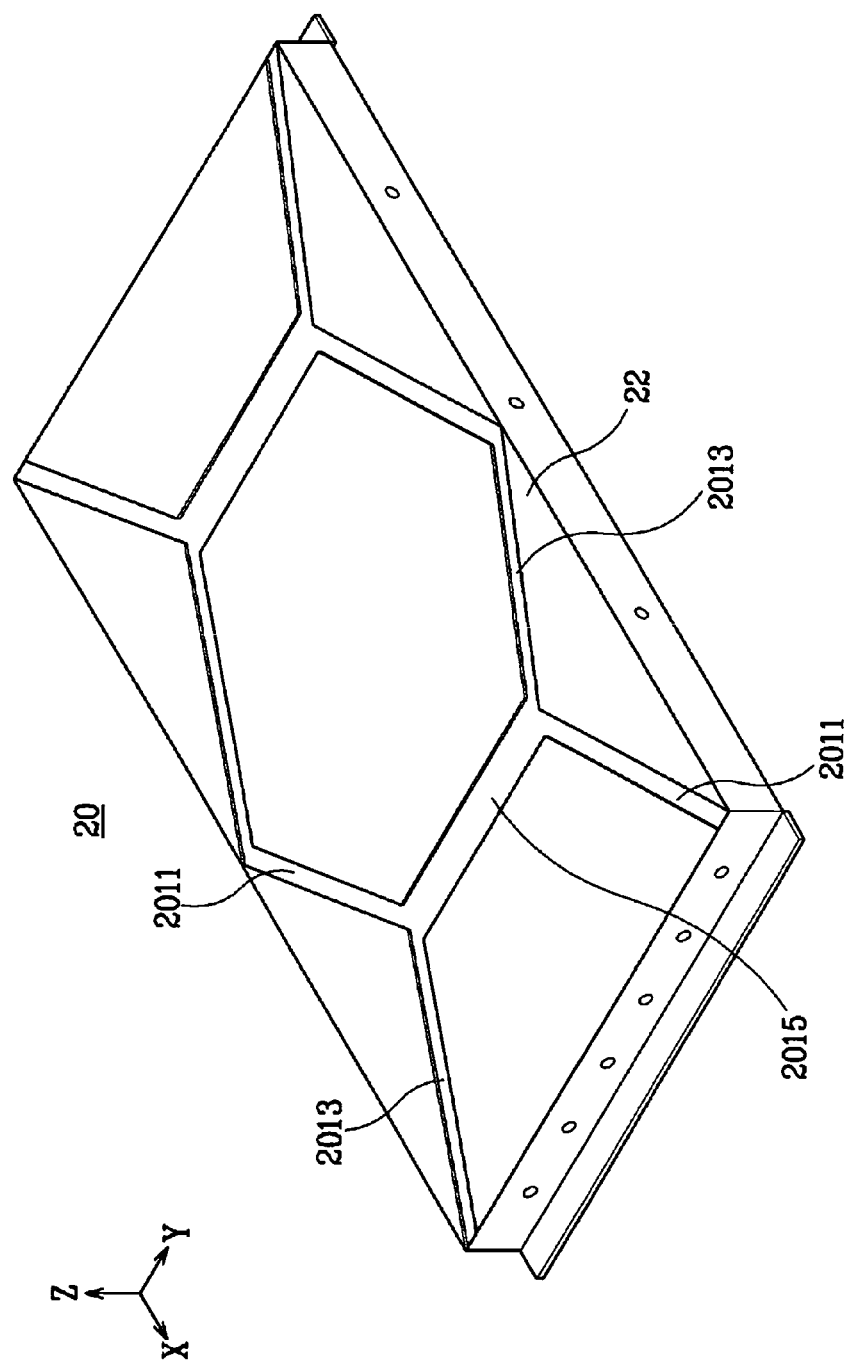
FIG. 5 is a rear perspective view illustrating a fixing member provided in a backlight assembly according to an embodiment of the present invention.

FIG. 5 shows a fixing member 20 provided in a backlight assembly according to an embodiment of the present invention. First deflection preventing portions 2011 and second deflection preventing portions 2013 are formed on the bottom surface 22 of the fixing member 20. Joints between the first deflection preventing portions 2011 and the second deflection preventing portions 2013 are mutually connected through connecting portions 2015.

The structure of the fixing member 20 is similar to that of the fixing member 10 shown in FIG. 4, except for the number of deflection preventing portions 2011 and 2013 and the number of connecting portions 2015.

Four first deflection preventing portions 2011 and four second deflection preventing portions 2013 are formed on the bottom surface 22 of the fixing member 20. The desired strength of the fixing member is capable of being achieved with this number of deflection preventing portions 2011 and 2013 and the corresponding connecting portions 2015 formed on the bottom surface 22 of the fixing member 20.

Figure 6:
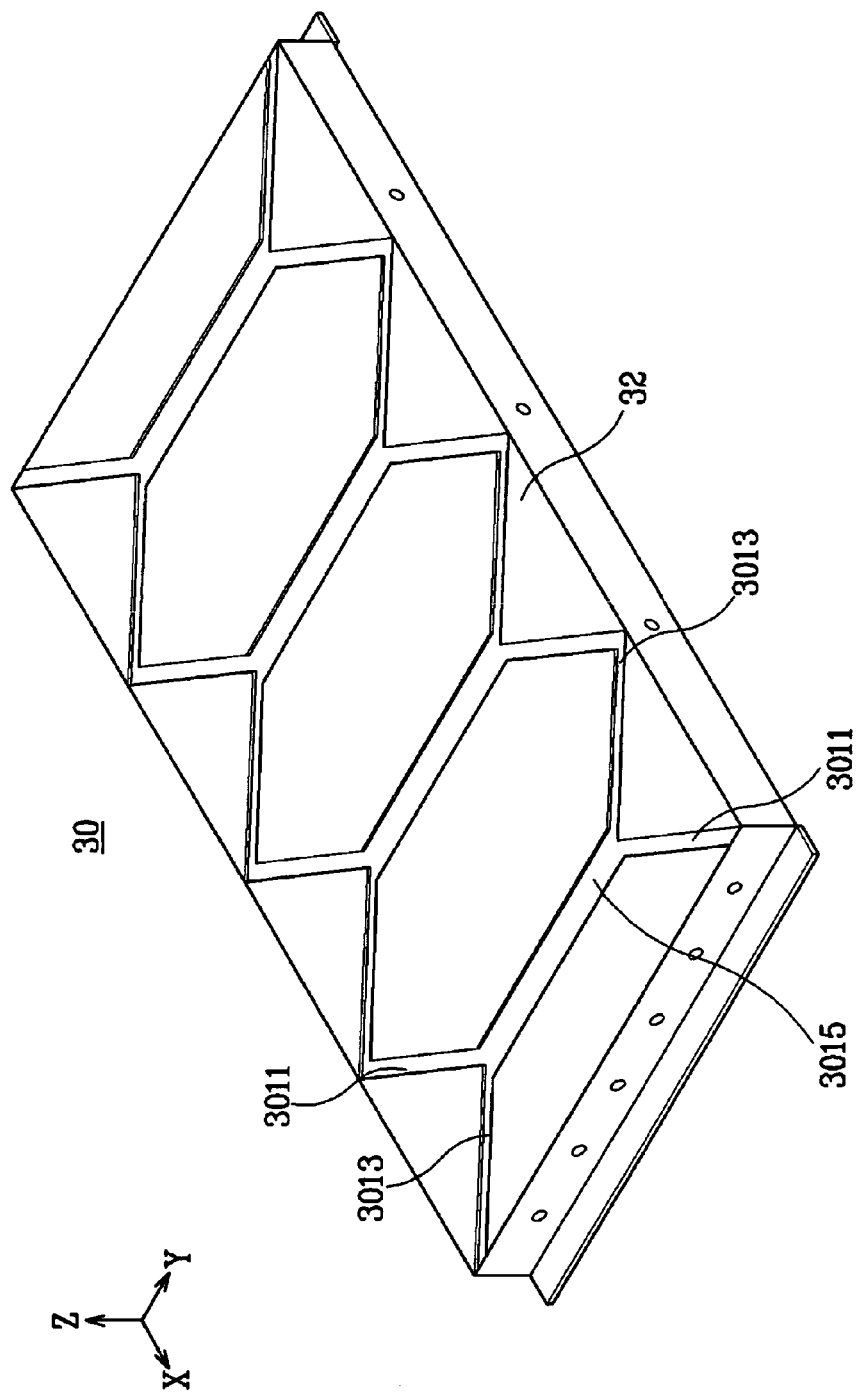
FIG. 6 is a rear perspective view illustrating a fixing member provided in a backlight assembly according to an embodiment of the present invention.

FIG. 6 shows a fixing member 30 provided in a backlight assembly according to an embodiment of the present invention. First deflection preventing portions 3011 and second deflection preventing portions 3013 are formed on the bottom surface 32 of the fixing member 30. Joints between the first deflection preventing portions 3011 and the second deflection preventing portions 3013 are mutually connected through connecting portions 3015.

The structure of the fixing member 30 is similar to that of the fixing member 10 shown in FIG. 4, except for the number of deflection preventing portions 3011 and 3013 and the number of connecting portions 3015.

Eight first deflection preventing portions 3011 and eight second deflection preventing portions 3013 are formed on the bottom surface 32 of the fixing member 30. By forming a proper number of deflection preventing portions 3011 and 3013 and a proper number of connecting portions 3015 on the bottom surface 32 of the fixing member 30, it is possible to achieve the desired strength of the fixing member 30.

Hereinafter, the embodiments of the present invention are described in more detail with reference to an experimental example.

The fixing member provided in the backlight assembly shown in FIGS. 1–4 and conventional fixing members are now compared with respect to degree of twist by using a simulation thereof.

FIGS. 7A to 7D schematically illustrate the shapes of the fixing members according to comparative examples 1 to 4, respectively. In the comparative examples, no bead is formed on the fixing member or beads are only formed in the longitudinal direction or the lateral direction of the fixing member. The degrees of twist of the fixing member according to the experimental example and of the fixing members according to the comparative examples are measured as follows.

A uniform pressure of 100 Pa is applied to the respective fixing members having the same size, but different shapes. Next, one corner of the fixing member is fixed and the opposite corner is lifted by about 50 mm. At this time, by measuring the maximum sinking amount of the other two corners, the degree of twist of the fixing member is obtained.

COMPARATIVE EXAMPLE 1

Figure 7A:
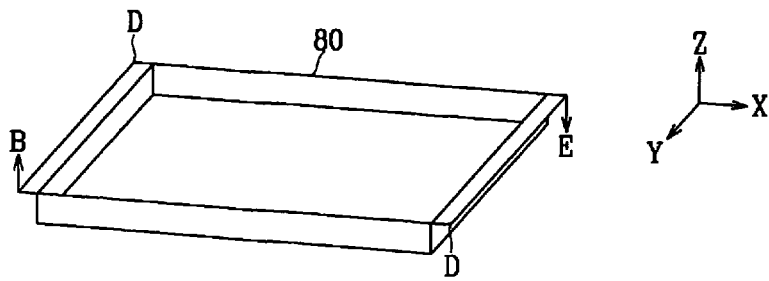
FIGS. 7A to 7D are perspective views illustrating bottom chasses according to comparative examples 1 to 4, respectively.

As shown in FIG. 7A, a fixing member 80 without a bead is prepared. By fixing Point E and lifting Point B by about 50 mm, the maximum sinking length at Point D is measured.

COMPARATIVE EXAMPLE 2

Figure 7B:
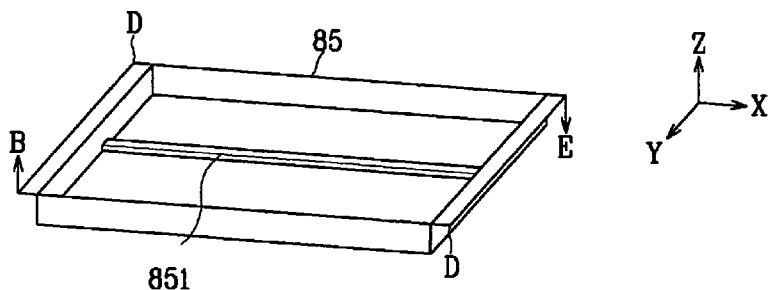

As shown in FIG. 7B, a fixing member 85 on which only one bead 851 is formed in the X axis direction is prepared. By fixing Point E and lifting Point B by about 50 mm, the maximum sinking length at Point D is measured.

COMPARATIVE EXAMPLE 3

Figure 7C:
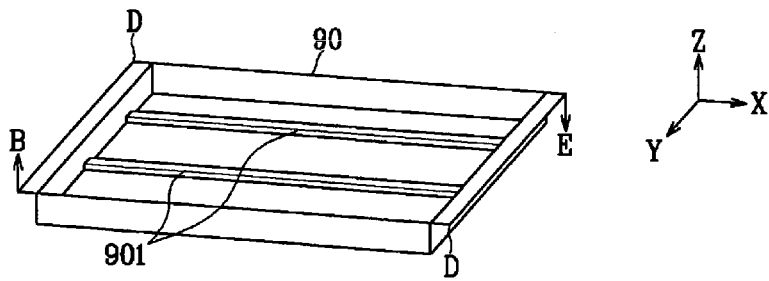

As shown in FIG. 7C, a fixing member 90 on which two beads 901 are formed in the X axis direction is prepared. By fixing Point E and lifting Point B by about 50 mm, the maximum sinking length at Point D is measured.

COMPARATIVE EXAMPLE 4

Figure 7D:
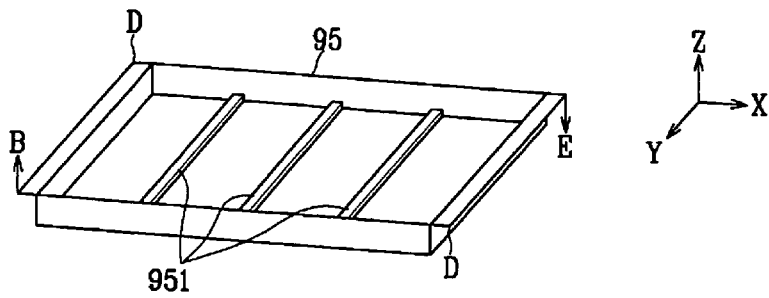

As shown in FIG. 7D, a fixing member 95 on which three beads 951 are formed in the Y-axis direction is prepared. By fixing Point E and lifting Point B by about 50 mm, the maximum sinking length at Point D is measured.

EXPERIMENTAL EXAMPLE 1

A fixing member on which the deflection preventing portions and the connecting portions are formed as shown in FIGS. 1–4 is prepared. Similar to comparative examples 1 to 4 described above, by fixing Point E and lifting Point B by about 50 mm, the maximum sinking length at Point D is measured.

The maximum sinking lengths measured in comparative examples 1 to 4 and experimental example 1 are shown in Table 1 for the purpose of mutual comparison.

TABLE 1

|  | Maximum sinking length | Comparison of sinking length |
| --- | --- | --- |
| Experimental example 1 | 14.7 mm | 100% |
| Comparative example 1 | 103.0 mm | 701% |
| Comparative example 2 | 95.0 mm | 646% |
| Comparative example 3 | 86.6 mm | 589% |
| Comparative example 4 | 88.9 mm | 605% |

The comparison of sinking length in Table 1 represents ratios of the maximum sinking length according to comparative examples 1 to 4 to the maximum sinking length according to experimental example 1.

The comparative example 1 has a maximum sinking length of 103.0 mm, which means that the sinking degree of comparative example 1 is about 7 times the sinking degree of experimental example 1. Therefore, when an external pressure acts on the fixing member 80, the fixing member 80 is twisted to a considerable extent.

The comparative example 2 has a maximum sinking length of 95.0 mm, which is less than that of comparative example 1, but the sinking degree of comparative example 2 is about 6.5 times the sinking degree of experimental example 1. Therefore, when an external pressure acts on the fixing member 85, the fixing member 85 is twisted to a considerable extent.

The comparative example 3 has a maximum sinking length of 86.6 mm, which is less than comparative example 2, but the sinking degree of comparative example 3 is about 5.9 times the sinking degree of experimental example 1. Therefore, when an external pressure acts on the fixing member 90, the fixing member 90 is twisted to a considerable extent.

The comparative example 4 has a maximum sinking length of 88.9 mm, which is greater than that of comparative example 3. The sinking degree of comparative example 4 is about 6.1 times that of experimental example 1. Therefore, when an external pressure acts on the fixing member 95, the fixing member 95 is twisted to a considerable extent.

The maximum sinking length of the fixing member according to experimental example 1 is 14.7 mm, which is much less than those of comparative examples 1 to 4.

It can be seen from experimental example 1 that the fixing member according to an embodiment of the present invention has strength enough to resist twist.

Although the exemplary embodiments of the present invention have been described herein with reference to the accompanying drawings, it is to be that the present invention is not limited to those precise embodiments, and that various other changes and modifications may be affected therein by one of ordinary skill in the related art without departing from the spirit and scope of the invention. All such changes and modifications are intended to be included within the scope of the invention as defined by the appended claims.

What is claimed is:

1. A backlight assembly comprising:
a light source; and
a fixing member receiving the light source,
wherein a deflection preventing portion having a predetermined width is formed on a surface of the fixing member in a direction crossing a diagonal of the surface of the fixing member, the deflection preventing portion including:
a plurality of first deflection preventing portions formed on the surface of the fixing member in a direction crossing a first diagonal of the surface of the fixing member; and
a plurality of second deflection preventing portions formed on the surface of the fixing member in a direction crossing a second diagonal of the surface of the fixing member, wherein a connecting portion formed on the surface of the fixing member and having a length less than a width of the fixing member connects a first deflection preventing portion and a second deflection preventing portion to each other at each end of the connecting portion.

2. The backlight assembly of claim 1, wherein the plurality of first deflection preventing portions and the plurality of second deflection preventing portions are formed to be alternately connected in an upper half area and a lower half area on a bottom surface of the fixing member.

3. The backlight assembly of claim 2, wherein the deflection preventing portions formed in the upper half area are symmetrical to the deflection preventing portions formed in the lower half area.

4. The backlight assembly of claim 2, wherein a plurality of connecting portions for connecting the first deflection preventing portions and the second deflection preventing portions to each other are formed on the bottom surface of the fixing member.

5. The backlight assembly of claim 4, wherein the connecting portions are formed by pressing the fixing member.

6. The backlight assembly of claim 4, wherein the plurality of the connecting portions are formed parallel to each other.

7. The backlight assembly of claim 4, further comprising a reflecting sheet located adjacent to the bottom surface of the fixing member,
wherein the connecting portions are protruded toward the reflecting sheet.

8. The backlight assembly of claim 1, wherein the plurality of first deflection preventing portions are formed parallel to each other.

9. The backlight assembly of claim 1, wherein the plurality of second deflection preventing portions are formed parallel to each other.

10. The backlight assembly of claim 1, wherein at least some of the plurality of first deflection preventing portions are formed to extend to at least one corner of two corners in a direction of the second diagonal.

11. The backlight assembly of claim 10, wherein a plurality of second deflection preventing portions crossing the second diagonal, are connected to the plurality of first deflection preventing portions extending to the at least one corner.

12. The backlight assembly of claim 1, wherein at least some of the plurality of second deflection preventing portions are formed to extend to at least one corner of two corners in a direction of the first diagonal.

13. The backlight assembly of claim 12, wherein a plurality of first deflection preventing portions crossing the first diagonal are connected to the plurality of second deflection preventing portions extending to the at least one corner.

14. The backlight assembly of claim 2, wherein the number or first deflection preventing portions is 4, 6, or 8.

15. The backlight assembly of claim 2, wherein the number of second deflection preventing portions is 4, 6, or 8.

16. The backlight assembly of claim 1, wherein the deflection preventing portion forms an angle α with respect to the diagonal of the surface of the fixing member, and the angle α satisfies the following expression, $$\arctan(W/L) < \alpha < 90°$$

where W denotes the width of the bottom surface of the fixing member and L denotes the length of the bottom surface of the fixing member.

17. The backlight assembly of claim 1, further comprising a reflecting sheet which is received adjacent to the bottom surface of the fixing member,
wherein the deflection preventing portion is protruded toward the reflecting sheet.

18. The backlight assembly of claim 1, wherein the light source includes a plurality of lamps positioned adjacent each other, the plurality of lamps being received in a line by the fixing member.

19. The backlight assembly of claim 1, wherein the deflection preventing portion is formed by pressing the fixing member.

20. A display device comprising:
a panel unit displaying an image;
a light source supplying light to the panel unit; and
a fixing member receiving the light source,
wherein a hexagonal-shaped deflection preventing portion is formed on a surface of the fixing member in a direction crossing a diagonal of the surface of the fixing member.

21. The display device of claim 20, wherein the deflection preventing portion includes:
a first deflection preventing portion formed on the surface of the fixing member in a direction crossing a first diagonal of the surface of the fixing member, arid
a second deflection preventing portion formed on the surface of the fixing member in a direction crossing a second diagonal of the surface of the fixing member.

22. The display device of claim 21, wherein a plurality of first deflection preventing portions and a plurality of second deflection preventing portions are formed to be alternately connected in an upper half area and a lower half area on a bottom surface of the fixing member.

23. The display device of claim 22, wherein connecting portions for connecting the first deflection preventing portions and the second deflection preventing portions to each other are formed on the bottom surface of the fixing member.

24. The display device of claim 23, further comprising a reflecting sheet located adjacent to the bottom surface of the fixing member,
wherein the connecting portions are protruded toward the reflecting sheet.

25. The display device of claim 21, wherein a plurality of first deflection preventing portions are formed to extend to at least one corner of two carriers in a direction of the second diagonal.

26. The display device of claim 25, wherein a plurality of second deflection preventing portions crossing the second diagonal, are connected to the plurality of first deflection preventing portions.

27. The display device of claim 21, wherein a plurality of second deflection preventing portions are formed to extend to at least one corner of two corners in a direction of the first diagonal.

28. The display device of claim 27, wherein a plurality of first deflection preventing portions crossing the first diagonal, are connected to the plurality of second deflection preventing portions.

29. The display device of claim 20, wherein the deflection preventing portion forms an angle a with respect to the diagonal of the surface of the fixing member, and the angle α satisfies the following expression, $$\arctan(W/L) < \alpha < 9°$$

where W denotes the width of the surface of the fixing member and L denotes the length of the surface of the fixing member.

30. The display device of claim 20, further comprising a reflecting sheet located adjacent to the surface of the fixing member,
wherein the deflection preventing portion is protruded toward the reflecting sheet.

31. The display device of claim 20, wherein the light source includes a plurality of lamps positioned adjacent each other, the plurality of lamps being received by the fixing member.

32. The display device of claim 20, wherein the panel unit is a liquid crystal display panel.

33. The display device of claim 21, wherein at least the first and second deflection preventing portions form respective sides of the hexagonal-shaped deflection preventing portion.

34. The display device of claim 33, wherein the hexagonal-shaped deflection preventing portion comprises at least two first deflection preventing portions and at least two second deflection preventing portions forming respective sides of the hexagonal-shaped deflection preventing portion.

35. A backlight assembly comprising:

a light source; and a fixing member receiving the light source, wherein:

a first deflection preventing portion is formed on the surface of the fixing member in a direction crossing a first diagonal of the surface of the fixing member, a second deflection preventing portion formed on the surface of the fixing member in a direction crossing a second diagonal of the surface of the fixing member, and a connecting portion formed on the surface of the fixing member, the connecting portion connecting a joint between the first deflection preventing portion and the second deflecting prevention portion, wherein the first and second deflection preventing portions each form an obtuse angle with the connecting portion.

* * * * *